United States Patent [19]

Mezzino et al.

[11] Patent Number: 4,529,613
[45] Date of Patent: Jul. 16, 1985

[54] PECTIN-BASED CLOUDING AGENT

[75] Inventors: Joseph F. Mezzino, Marlboro; Locus Y. Chuang, Plainsboro, both of N.J.

[73] Assignee: General Foods Corporation, White Plains, N.Y.

[21] Appl. No.: 537,185

[22] Filed: Sep. 29, 1983

[51] Int. Cl.$^3$ ............................................. A23L 2/00
[52] U.S. Cl. ................................. 426/590; 426/654; 426/658
[58] Field of Search ............... 426/590, 274, 531, 591, 426/658, 650, 651, 654, 330.3, 330.5, 333, 616

[56] References Cited

U.S. PATENT DOCUMENTS

| | | | |
|---|---|---|---|
| 2,455,382 | 12/1948 | Nelson | 426/333 |
| 3,404,990 | 10/1968 | Villadsen | 426/431 |
| 3,658,552 | 4/1972 | Carlson et al. | 426/590 |
| 4,187,326 | 2/1980 | Serafino | 426/590 |

FOREIGN PATENT DOCUMENTS 2331292  11/1975  France .

OTHER PUBLICATIONS

Braddock et al., "Use of Enzymes in Citrus Processing", Food Tech. vol. 80, Nov. '79, pp. 78, 80, 81 & 83.
Towle et al., "Pectin", Indust. Gums by Whistler et al., pp. 429, 430 & 440, Academic Press, NY 1973.
Hawley, "The Condensed Chemical Dictionary", Van Nostrand Reinhold Co., N.Y. 8th ed. 1971.

*Primary Examiner*—Robert Yoncoskie
*Assistant Examiner*—Marianne S. Minnick
*Attorney, Agent, or Firm*—Barbara Toop D'Avanzo; Thomas Savoie; Daniel J. Donovan

[57] ABSTRACT

The present invention provides an improved cloud system which imparts enhanced mouthfeel and optimum opacity to a reconstituted beverage-mix. The cloud system is composed of a water-soluble polymeric carrier component, a pectin stabilizing agent and titanium dioxide as the opacifying agent.

3 Claims, No Drawings

PECTIN-BASED CLOUDING AGENT

BACKGROUND

Technical Field

The present invention relates generally to clouding agents which are added to soluble comestible mixes, and more particularly to a dry beverage mix wherein a non-oil clouding agent principally composed of a pectic agent is employed to induce opacity and augment mouthfeel of the reconstituted beverage mix.

A major problem encountered in the commercialization of a dry comestible or fruit-flavored beverage is to make said beverage duplicative of its natural-fruit counterpart. Furthermore, the beverage product must have the mouthfeel, opacity, flavor, and color properties, so that the imitation resembles the natural product. In order for the proposed beverage mix to be acceptable to the consumer, the beverage mix must easily and instantaneously go into solution and give the impression that a natural-looking product has been produced therefrom. Moreover, the perception that the beverage is natural must be sustained for a prolonged periods of refrigerator storage measured in days. The prolonged storage of the reconstituted beverage is oft times under adverse conditions of temperature and humidities, however, the integrity of the cloud must be sustained.

As to the prior art, in the area of clouding-agents, several attempts stand as the most relevant "art" references to the above.

U.S. Pat. No. 4,187,326, issued to Serafino et al. speaks to such a clouding agent. The invention relates to a clouding agent composed essentially of maltodextrin wherein small amounts of xanthan gum and titanium dioxide (TiO2) are suspended within said aqueous dextrinous solution. U.S. Pat. No. 3,023,106 issued to Common speaks to the use of a plastic fat composed essentially of a hydrogenated vegetable oil. U.S. Pat. No. 3,658,552 issued to Carlson uses a combination of a plastic fat and gum Arabic with titanium dioxide to obtain a powdered clouding agent.

In view of the fact that such methods as described heretofore are relatively expensive or are of a compromised efficiency due to their relative inability to suspend TiO2 in solution, there has been a long-standing need for a replacement for the above-referenced agents. Hence, it would be highly desirable to substitute another agent for the gum portion an agent wherein a proportionately greater amount of TiO2 could be substituted therefor.

SUMMARY OF THE INVENTION

The present invention provides a clouding agent being essentially composed of a water-soluble polymeric carrier, a pectic stabilizer, and an oxide opacifier of optimum opacity and mouthfeel, the use of which is ideally suited to dry beverage mixes. Moreover, the cloud system is readily soluble in an aqueous media as well as being amenable to prolonged storage when constituted. The invention allows one to suspend titanium dioxide (TiO2) within pectin or pectic material matrixes in a ratio where the TiO2 component can be used in levels not heretofore obtainable, said levels reflecting a three-fold increase over xanthan or other gum-based systems.

DETAILED DESCRIPTION OF THE INVENTION

Set out herein below in a stepwise fashion is the clouding agent containing as two main ingredients a pectic substance and titanium dioxide. For purposes of the present invention, a pectic carrier which is described hereinbelow shall be the prototypic substance.

The pectic substances are polysaccharides (g.v.) consisting mainly of colloidal polygalacturonic acids (polyuronides derived from the hexuronic acid, CHO (CHOH)4- COOH, and related to galactose), and are universally present in plant tissues. Pectins are used chiefly because of their unusual colloidal properties, of which the most important is the ability to form gels or jellies either with polyhydroxy compounds like sugars or with minute quantities of polyvalent ions. This term is used to cover a group of related complex, colloidal carbohydrate derivatives found in plants and composed predominantly of polygalacturonic acids formed by the chainlike combination of anhydrogalacturonic acid residues. Some of the carboxyl groups of the polygalacturonic acids are esterified by methyl groups and some are usually neutralized by one or more bases.

Pectinic acids are polygalacturonic acids (pectic acids) of colloidal nature in which some of the carboxyl groups are esterified with methyl groups.

The salts of pectinic acids are acid or neutral pectinates. The term pectin designates pectinic acids containing at least 7 or 8% methyl ester groups, expressed as methoxyl, and capable of forming gels (jellies) with sugar (or other polyhydroxy compounds) and acid under suitable conditions.

Pectic acid is the term applied to colloidal polygalacturonic acids containing no esterified carboxyl groups. The salts of pectic acids are the acid or neutral pectates.

Low-ester (low-methoxyl) pectins are a group of pectinic acids containing 3-7% methoxyl in contrast with the usual 7-12% in pectins. Low-ester pectins are usually prepared from pectins of high ester contents by partial deesterificaton. They have gained considerable prominence in recent years on account of some unusual and useful properites they possess.

The pectic substances are composed of polygalacturonic acids built from straight chains of anhydrogalacturonic acid residues connected predominantly by 1,4-glycosidic linkages. It also became clear from the application of the methods of colloid chemistry to pectins that the polygalacturonic acid units are of large but varying sizes.

While many investigators believe that the true pectic substances consist only of the polygalacturonic acid units esterified to various extents, others claim that arabans and galactans (or arabinose and galactose), which commonly occur together with pectic substances, are linked in some manner with the polygalacturonic acid units, either as components of the polymer at infrequent intervals or as side chains. Further alleged components of pectic substances are sorbose and rhamnose. Acetyl groups are known to occur in significant quantities in beet pectin although they may be present in other pectin preparations in very small proportions. Arabinose, galactose, rhamnose, and sorbose, or their polymers, are regarded by many as admixtures which find their way into pectin preparations on account of their similar behavior during precipitation and other methods of separation. They are often designated as "ballast" constituents.

There is some indication that other structural elements or linkages (in addition to the anhydrogalacturonic acid units linked through carbon atoms 1 and 4) might participate in the formation of the macromolecule. Such large molecules might be formed through the aggregation of already large polygalacturonic acid molecules through hydrogen bonding, through bonding by a very small proportion of polyvalent ions, through the formation of anhydrides or lactones, or by other means.

The average molecular weights found for pectin preparations vary considerably, ranging from about 30,000 to 300,000, depending on origin, method of preparation, and method of measurement. The agreement between the molecular-weight figures obtained by various means is not impressive nor is the correlation between the degree of colloidal behavior and the molecular-weight ranges very satisfactory. However, within given sets of determinations on samples of similar origin, and using the same method of determination, there is a general correlation between the molecular-weight ranges observed on the one hand, and viscosity, gel, and jelly formation, etc., on the other. Some of the methods used for molecular-weight determinations are viscosity measurements, diffusion rates, sedimentation-velocity measurements, and osmotic-pressure determinations.

Dry purified pectin is a white or light-colored solid, soluble in hot water to the extent of about 2–3%. Upon contact with water a powdered pectin preparation will "lump" or "clump," and unless precautions are taken, it will form hard particles, slimy on the outside and dry inside. For this reason dry pectin is always thoroughly mixed with sugar, buffer salts, or other chemicals, or is first moistened with ethanol before water is added. Pectin of lower quality or grade will form more concentrated solutions. The most important property of pectin from the practical standpoint is its ability to form a jelly with sugar and acid.

The acid groups in pectin and pectic acid can form salts and be titrated directly in the usual manner. The titration curves of pectic acid superfically resemble those for monobasic acids. The pH of 0.5–1.0% solutions of pectins and pectinic acids is usually 3.2–3.4. Treatment with acids will progressively deesterify pectinic acids, proper conditions, the amount of carbon dioxide evolved is exactly that required by theory, and therefore this method is often used for the estimation of uronic acids and of pectic polyuronides. Addition of alkali will progressively deesterify pectinic acids and will eventually cause some degradative changes which are not well understood but involve the consumption of some alkali in addition to that used for the ester hydrolysis.

Although some low-ester pectins occur in plants, they are usually manufactured from high-ester pectins. The partial deesterification may be performed by the use of acid, alkali, or enzymes. A fourth method, using ammoniacal ethyl alcohol or concentrated ammonium hydroxide in water, has also been described. In the latter case the deesterification is accompanied by the formation in the pectinic acids of both $-CONH^2$ and $-COONH^4$ groups so that the resulting compound will contain these in addition to the free carboxyl and methyl ester groups.

The partial deesterification may be combined with the extraction as in the "pickling method". Here the starting material (citrus peel or apple pomace) is mixed with hydrochloric acid barely sufficient to moisten the tissues but concentrated enough to give a pH of about 0.7. The mixture is kept at 104° F. When the desired extents of solubilization and deesterification have been reached, the pH of the mixture is raised to 3.0 and the pectin is extracted, often with the aid of polyphosphates.

In the acid deesterification of prepared pectin, the pectin solution is adjusted to pH 0.3 with hydrochloric acid and kept at about 122° F. for several days. Much of the admixed nonpolyuronide "ballast" material is also hydrolyzed, increasing the purity of the preparation. The major drawback of this method is its slowness. The deesterification proceeds at about 1/100 of the rate of the alkaline deesterification at the same temperature.

The chief drawback of alkaline deesterification is the well-known but little understood degrading effect of alkali on pectinic acids. On the other hand, the deesterification is rapid and the extent of deesterification is easy to regulate by the amount of alkali consumed. Deesterification in the cold or, better yet, near the freezing point seems to be more suitable and to result in better preservation of colloidal properties. Alkaline deesterification is activated by certain ions such as calcium and magnesium.

Although partial deesterification by enzymes is used to a limited extent in the manufacture of slow-set pectins, enzymatic preparation of low-ester pectins has not attained much importance since it appears that chemical means of deesterification yield a product of more suitable properties.

Pectinic acids may also be deesterified in situ by the slow addition of alkali to a slurry of the pectin-containing raw material. It is not quite clear to what extent such deesterification is caused by the deesterifying enzymes present in the raw material (especially citrus peel) rather than by the alkali added. Here also, the reaction is easly controlled by the alkali consumption. Deesterification is followed by extraction of the pectins at a low pH value and in the presence of polyphosphates.

The low-ester pectins prepared by any of these methods may be precipitated by the addition of organic solvents, by traces of calcium, or by lowering of the pH to 1.3 (if the methoxyl content is below about pH 3.5). The precipitate can then be pressed out in a hydraulic press to a solids content of about 30%.

In the present invention a pectic material is required, said material comprising from 1% to 30% of the cloud composition, with a preferred range of from 5% to 9%. Moreover the preferred pectic material comprises, but is not limited, to pectin, said pectin having a methoxyl content of between 3% and 15% and the degree of methylation of from 50% to 90%. As a representative pectin, conforming to the specifications in the United States Pharmacopoeia, (U.S.P.X. 1980) Atlantic Citrus Pectin U.S.P. (manufactured by Atlantic Gelatin of Hollywood, Calif.) is operatively active for the present use.

| ATLANTIC CITRUS PECTIN | |
|---|---|
| Methoxyl Content (Dry Bases) | 6.7% min. |
| Galacturonic Acid | 74% min. |
| Moisture | 10% |
| Degree of Methylation (D.M.) | 60%–75% |

Another quality of pectins is that they display unique viscosities, allowing said pectins to be classified as low viscosity 15–27 cps, Medium Viscosity 27–37 cps and High Viscosity 37–57 cps. The viscosity test is conducted at 25° C. using a 1% pectin/water solution and reading appropriate values from a Brookfiled Viscometer Model LUF with a #1 spindle at 60 RPM. For the present invention a viscosity of from 20 cps to 50 cps is operative, with a range of from 28 cps to 35 cps preferred.

A cloud system constructed according to the following parameters follows. A pectin, as that cited hereinabove, comprises from 0.5% to 30% by dry weight of the cloud system. Titanium dioxide ($TiO_2$) of from 0.1% to 30% by weight, or more preferably from 14% to 20% may be used.

Illustrated hereinbelow are examples of cloud systems which conform to aforementioned system parameters, and are illustrative of the present invention. Therefore, what is presented below is not meant to limit the present invention; it only is illustrative of a cloud system which presents improved mouthfeel and optimum opacity.

The term opacity as used in this invention relates to the level of light transmittance of an aqueous solution. A laboratory instrument such as a Bausch Lomb Spec 20 (TM) is used to measure such light transmittance levels.

The clouding agent of this invention is prepared by dispersing and co-drying solubilized malto dextrin, (solubilized is an aqueous solution), pectin and dispersed titanium dioxide to produce a dry powder which manifests a clouding effect when incorporated in an artificial beverage.

For purposes of the present invention a water-soluble polymeric material is necessary as a carrying agent. Water-soluble polymeric materials include dextrins, modified starches and gums. The preferred embodiment for the present invention is a dextrinous carrier. Various malto dextrins (hydrolyzed cereal solids) which are starch hydrolysates produced by converting pure refined corn starch into nutrititve saccharides through the use of acids or specific enzymes. The carbohydrate composition of malto dextrin is arranged to yield a DE (dextrose equivalent) of less than 20. They are typically bland in flavor and without appreciable sweetness. Preferably, the malto dextrin as used in the instant invention will have a dextrose equivalent of between 0.5 and 20. As used herein, the malto dextrin sold under the trademark Lo-Dex TM 15 by the American Maize-Products Company has been found most preferable.

It is a white free-flowing powder extremely bland in taste with little or no sweetness. Additionally, Titanium dioxide as used herein is preferably a purified inorganic white, named by the 1971 Colour Index, 6 pigment white 6, C.I. 77891. It is available from H. Kohnstamm & Company and typically has the following characteristics.

| TITANIUM DIOXIDE TECHNICAL DATA | |
|---|---|
| Crystal Type | Anatase |
| Specific Gravity | 3.9 |
| Pounds per Solid Gallon | 32.5 |
| 1 Pound Bulks, Gals. | .0308 |
| Minimum $TiO_2$ | 99% |
| Spatula Water Absorption | 30 lbs. water/100 lbs. Pigment |
| Spatula Oil Absorption | 20–22 lbs. oil/100 lbs. Pigment |

| -continued | |
|---|---|
| TITANIUM DIOXIDE TECHNICAL DATA | |
| Average Particle Diameter | 0.3 Microns |
| Screen Test | 99% Through 325 Mesh Screen |
| | 100% Through 200 Mesh Screen |
| | (CTFA Method C 6-1, Wet Screening) |
| | (ASTM D-185-45) |

The cloud composition of the instant invention is preferably added to constituent ingredients necessary to formulate a dry beverage mix. Therefore, unless otherwise indicated all percentages herein referred to will be in relation to the total dry mix (as in the instant example) composition. Thus, the malto dextrin may be present in the range of 0.05% to 4.5% by weight. Preferably the range will be 0.1% to about 0.7%. The pectic-substance or pectin will be present in the range between 0.01% and about 10% by weight. Preferably the pectin will be present in the amount of 0.03% to about 0.1% by weight. The titanium dioxide will be present in amounts between 0.001% and 1.0% by weight, and preferably between 0.025% and 0.075%. Preferably the titanium dioxide will be finely divided say 0.1 micron to about 0.7 microns in particle size.

A number of unexpected results arise from the combination of the three components of the instant clouding composition. More importantly it has been found that it is critical that the titanium dioxide be added to an aqueous solution of malto dextrin and pectin and the resultant suspension be dried concurrently or co-dried. The combination of each component by mixing in its dry form does not have utility. The titanium dioxide immediately begins to precipitate when the mix is put in a beverage. Likewise, co-drying titanium dioxide with either malto dextrin or pectin separately does not work. The titanium dioxide again immediately precipitates when used in a beverage. Surprisingly the co-drying combination permits a cloud which is useful in a beverage for periods of at least 24 hours and preferably at least 48 hours when the beverage is stored at 50° F. with a threefold increase in the amount of $TiO_2$ over such acceptable systems as these containing carboxymethyl cellulose or xanthan.

Another unexpected result of the instant invention relates to the amount of pectin necessary to contribute the desired mounthfeel (viscosity) in an artificial fruit beverage. Conventionally, carboxy methyl cellulose is used in the amount of 0.46% by weight of the dry beverage mix composition to impart the desired effect. To substitute pectin as a direct replacement for carboymethyl cellulose one would be required to use 0.1% by weight of pectin. To substitute pectin for xanthan, 0.1% by weight would be required. It has been found that on a comparative basis, when pectin is contained within the composition of the instant invention that only about one-third the amount by weight of the cloud system would be necessary to achieve the desired viscosity/mouth-feel characteristics. Another unexpected result is that two particular levels of malto dextrin have been identified as being most effective for presenting cloud-system having the desired physical properties. Those levels are 1.75% and 3.00% of malto dextrin by weight of the dry beverage mix. Thus, while levels of malto dextrin of between 0.5 and 5.0% by weight of the dry mix are effective, the unexpected benefits displayed by this invention are most evident at the two specific levels identified.

In the preparation of the product of this invention, it is preferable to use a vessel which has provision for mixing under high shear. Additionally, the malto dextrin and pectin will solubilize more quickly if the aqueous system is heated preferably to about 180° F. Higher temperatures may be used, but in no case should they exceed the boiling point of the composition. The resultant solution or suspension is then maintained at an elevated temperature in preparation for drying. Most advantageous due to process cost and volume considerations is the utilization of a spray dryer to evaporate the water from the aqueous mixture and thus obtain a powderous clouding agent from the co-dried ingredients. Those skilled in the art will recognize that other method of drying may be employed such as freeze drying, drum drying, vacuum drying, etc. Typically in spray drying, the product will be fed to the drying tower by means of a Ross In-line Homogenizer under working pressures of between 500 psi and 3,000 psi. Such pressures inflict additional shearing force on the mixture and further serve to homogenize and reduce the particle size of the product.

The dried cloud ingredients are typically mixed with other beverage materials such as tartaric acid, citric acid or other food acids, sugars such as sucrose, dextrose, fructose and the like, artificial sweeteners, suitable coloring agents such as orange coloring, cherry coloring, grape coloring and the like, fruit flavors such as orange, grape, lemon, lime and the like and other art recognized beverage additives.

The invention is more fully described but not limited by the following examples.

EXAMPLE 1

To prepare the cloud according to the preferred embodiment of this invention, the following procedure is followed.

To a high shear planetary-type mixture is added a pre-blended dry mix of 77.73 pounds of malto dextrin sold under the trademark Lo-Dex TM 15 available from American Maize-Products Company and 7.77 pounds of low methoxyl pectin sold under the tradename Pectin U.S.P. available from Atlantic Pectin and 417 gallons of water with constant mixing. To the resulting solution is added 14.5 pounds of food grade titanium dioxide. During the mixing the temperature of the solution is elevated to about 150° F. Next the mixer speed is increased to maximum speed and shear and is maintained for a 60–90 minutes period. The product is then transferred to a separate holding tank preparatory to spray drying. The mixture enters the spray drying tower by means of passage through a two stage Manton Gaulin positive displacement pump. The first stage and second stage are operated at 2,000 psi pressure and 3,000 psi pressure, respectively. The solution enters the upper portion of the drying tower through a series of spray nozzles. The inlet air temperature of the drying tower is about 500 F. The exit air temperature in the lower portion of the tower is about 195 F. The product exiting the bottom of the tower is a dry flowable powder having a moisture content below about 2.5%

EXAMPLE 2

A fruit flavored beverage mix is prepared employing the cloud prepared as in Example 1 and in accordance with the following formulation:

| Beverage Mix A | |
|---|---|
| Ingredient | Percent |
| Sugar | 88.522 |
| Citric Acid | 5.318 |
| Cloud* | 1.825 |
| Flavor and Flavor Enhancers | 1.143 |
| Monocalcium Phosphate | 1.137 |
| Potassium Citrate | 0.780 |
| Dry Calcium Phosphate | 0.664 |
| Vitamin C | 0.511 |
| Carboxymethylcellulose | 0.460 |
| Vitamin A | 0.036 |
| Color | 0.028 |
| | 100.000 |
| Cloud* | |
| Malto Dextrin (Lo-Dex 15(TM) | 95.89 |
| Pectin (Pectin U.S.P) | 1.37 |
| Titanium Dioxide (TiO$_2$) | 2.74 |
| | 100.000 |

For comparison, a conventional fruit flavored beverage mix is prepared in accordance with the following formulations:

| Beverage Mix B | |
|---|---|
| Ingredient | Percent |
| Sugar | 88.309 |
| Citric Acid | 5.381 |
| Cloud* | 1.574 |
| Monocalcium Phosphate | 1.137 |
| Potassium Citrate | 0.780 |
| Tricalcium Phosphate | 0.664 |
| Vitamin C | 0.511 |
| Flavor and Flavor Enhancers | 1.143 |
| Carboxymethylcellulose | 0.500 |
| Vitamin A | 0.036 |
| Color | 0.028 |
| | 100.000 |
| Cloud* | |
| Modified Starch | 76.440 |
| Hydrogenated Coconut Oil | 19.600 |
| Titanium Dioxide | 1.960 |
| Tricalcium Phosphate | 2.000 |
| | 100.000 |

191.8 grams of Beverage Mix B is reconstituted in 45.5 ounces of water and produced a beverage with an opacity reading of 47.5T a Bausch Lomb Spec 20 opacity meter.

The product of Beverage Mix B after being reconstituted in 50° F. water and held at that temperature for 24 hours displayed precipitation of the cloud system. Titanium dioxide came out of solution and settled at the bottom of the sample flask with an attendant reduction in opacity. The product of Beverage Mix A has no apparent precipitation or change in opacity after 24 hours at 50° F. Additionally the product of Beverage Mix A is readily dispersible in cold water and does not display the clumping or streaking problems associated with beverages mixes which have oil.

What is claimed is:

1. A dry clouding system for beverage mixes prepared by drying an aqueous mixture which, on a solids basis, consists essentially of:
   (a) from 5 to 9% by weight of a methoxy pectin having a degree of methoxylation of from 3 to 15% and a degree of methylation of from 50 to 90%;
   (b) from 14 to 20% by weight of finely divided TiO$_2$; and (c) from 40 to 80% by weight of a water-soluble material selected from the group consisting of dextrin, modified starches and gums.

2. A dry clouding system as described in claim 1 wherein the water-soluble material is a dextrin of from 0.5 to 20 DE.

3. A beverage mix containing the cloud system of claim 1, wherein the cloud system is present at a level of from 0.01% to 1.0% by weight of the total beverage mix.

* * * * *